United States Patent
Dandurand et al.

(10) Patent No.: US 8,083,296 B2
(45) Date of Patent: *Dec. 27, 2011

(54) DRIVE TRACK FOR SNOWMOBILE OR TRACKED VEHICLE

(75) Inventors: Jules Dandurand, Sherbrooke (CA); Denis Courtemanche, Richmond (CA)

(73) Assignee: Camoplast Solideal Inc., Sherbrooke, Quebec (CA)

( * ) Notice: Subject to any disclaimer, the term of this patent is extended or adjusted under 35 U.S.C. 154(b) by 453 days.

This patent is subject to a terminal disclaimer.

(21) Appl. No.: 11/797,267

(22) Filed: May 2, 2007

(65) Prior Publication Data

US 2007/0205661 A1 Sep. 6, 2007

Related U.S. Application Data

(63) Continuation-in-part of application No. 11/434,057, filed on May 16, 2006, now Pat. No. 7,823,987.

(30) Foreign Application Priority Data

Jun. 2, 2005 (CA) ..................................... 2509059

(51) Int. Cl.
*F16G 1/00* (2006.01)
*B62D 55/24* (2006.01)

(52) U.S. Cl. ......................... 305/166; 305/170; 305/171

(58) Field of Classification Search .......... 305/165–171, 305/177, 157–158, 172–176, 178–184; 474/266–267, 260–262

See application file for complete search history.

(56) References Cited

U.S. PATENT DOCUMENTS

| | | | |
|---|---|---|---|
| 1,924,354 A * | 8/1933 | Freedlander | 474/261 |
| 2,793,150 A * | 5/1957 | Deaves | 305/166 |
| 3,480,339 A | 11/1969 | Kell | |
| 3,485,707 A * | 12/1969 | Spicer | 442/214 |
| 3,704,918 A * | 12/1972 | Perreault | 305/168 |
| 3,712,689 A | 1/1973 | Chaumont | |
| 3,721,477 A | 3/1973 | Cooper et al. | |
| 3,858,948 A | 1/1975 | Johnson et al. | |
| 5,145,242 A | 9/1992 | Togashi | |
| 5,380,076 A | 1/1995 | Hori | |
| 5,593,218 A | 1/1997 | Katoh et al. | |
| 5,730,510 A | 3/1998 | Courtemanche | |
| 6,007,912 A | 12/1999 | Doujak | |
| 6,109,705 A | 8/2000 | Courtemanche | |
| 6,203,125 B1 | 3/2001 | Arakawa et al. | |
| 6,406,655 B1 | 6/2002 | Courtemanche | |
| 6,811,877 B2 | 11/2004 | Haislet et al. | |
| 7,304,006 B2 * | 12/2007 | Lee et al. | 442/207 |
| 7,823,987 B2 * | 11/2010 | Dandurand et al. | 305/166 |
| 2001/0009336 A1 * | 7/2001 | Hori | 305/189 |
| 2002/0067074 A1 * | 6/2002 | Katayama et al. | 305/170 |
| 2002/0175563 A1 * | 11/2002 | Katayama | 305/165 |
| 2006/0105874 A1 * | 5/2006 | Shimamura | 474/266 |

* cited by examiner

*Primary Examiner* — Jason Bellinger

(57) ABSTRACT

A track formed of a molded rubber base sandwiching a cord layer and a single layer of ply fabric extending longitudinally of the track.

63 Claims, 10 Drawing Sheets

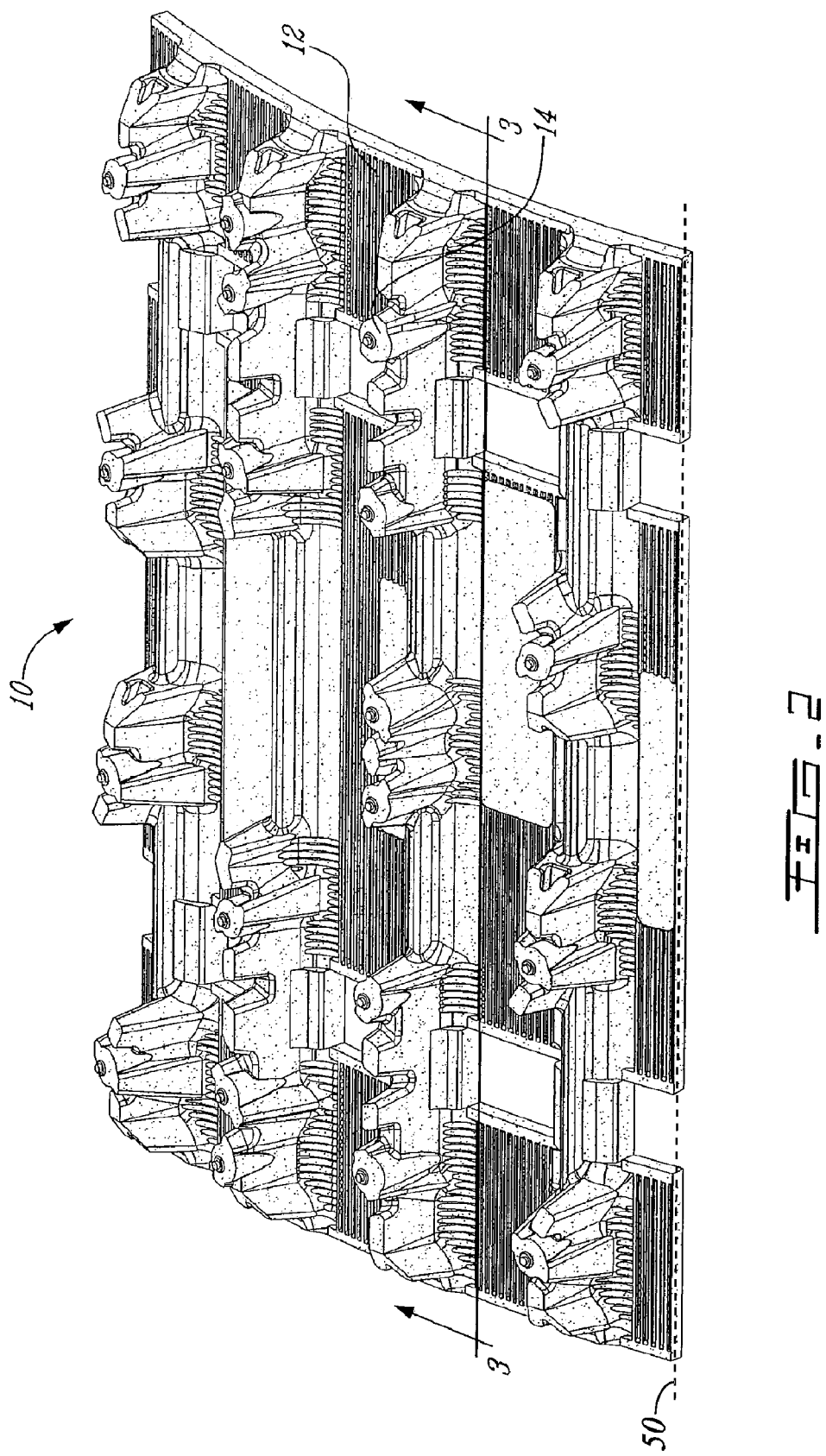

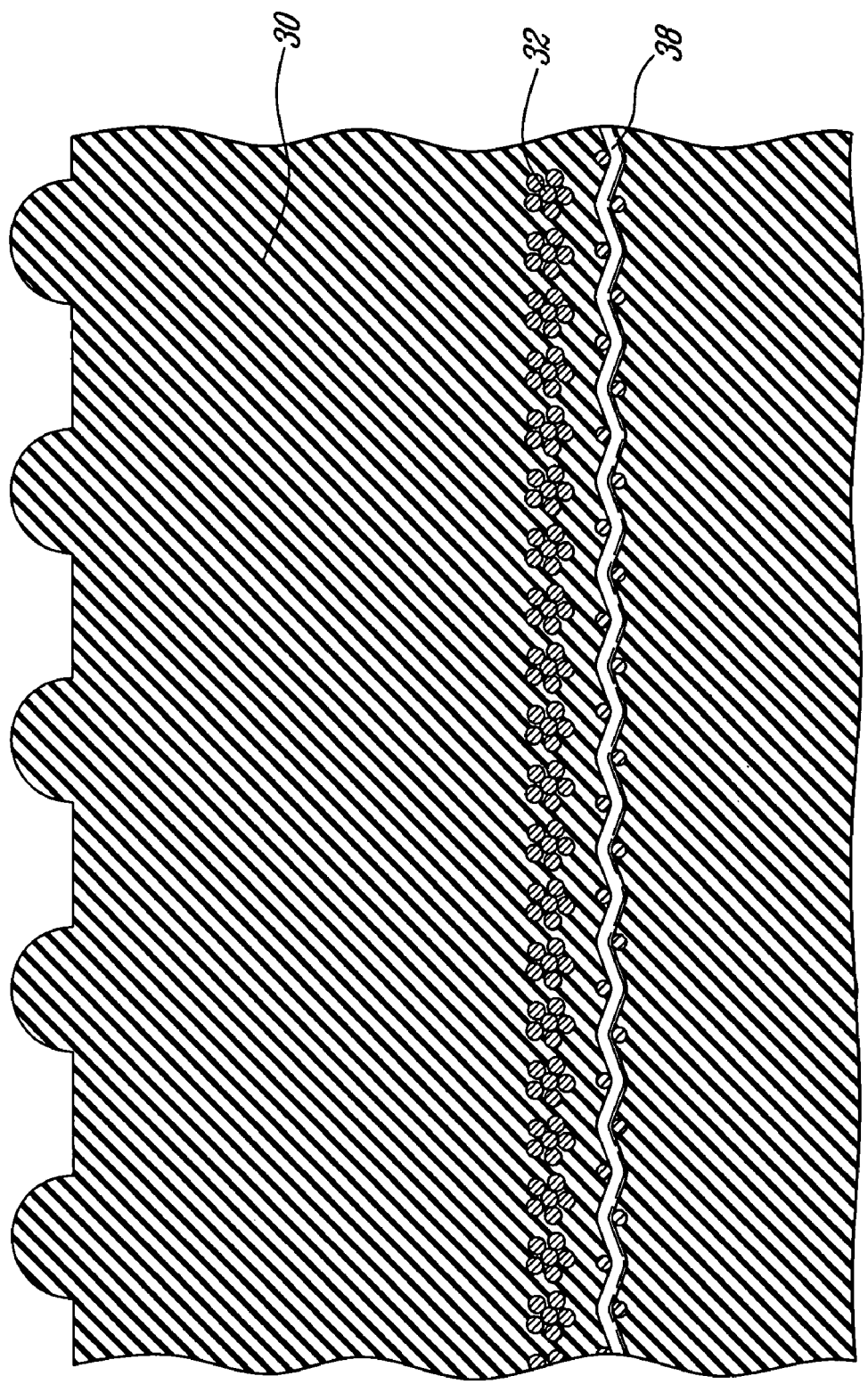

US 8,083,296 B2

DRIVE TRACK FOR SNOWMOBILE OR TRACKED VEHICLE

CROSS REFERENCE TO RELATED APPLICATIONS

This application is a continuation-in-part application of U.S. patent application Ser. No. 11/434,057 filed May 16, 2006, now U.S. Pat. No. 7,823,987, which itself claims priority on Canadian application no. 2,509,059, filed on Jun. 2, 2005. All documents above are herein incorporated by reference.

FIELD OF THE INVENTION

The present invention pertains to a drive track and, more particularly, to a track for snowmobiles or other tracked vehicles, having an improved construction to decrease horse power, increase top speed and improve durability of the track when the latter is driven at high rotational speeds.

BACKGROUND OF THE INVENTION

Endless drive tracks for propelling, for example, a snowmobile over snow, ice or other similar ground structure, are known in the art. The mounting of this track to a snowmobile and the mounting of such track on an all-terrain vehicle are well known. The track has a ground engaging outer side and an inner side that receives and supports, on the lower run thereof, a suspension which may consist of a wheel assembly or a slide rail assembly, both of which are also well known in the art.

Conventionally, the track rotates by means of a motor driven sprocket unit at the forward end of the vehicle and idle drive wheels are mounted at the aft end of the vehicle to support the rear end of the track. Sprockets engage a series of lugs integrally formed with the inner surface of the track.

With reference to FIG. 1, the endless body is generally formed of a molded rubber base having, embedded therein, a first layer of reinforcing fabric 38 extending longitudinally of the track, a series of laterally spaced cord strands 40 which extend between the first layer of fabric and beneath a rod 34, and a second ply 36 fabric disposed above the rod 34. Such arrangement has been shown to allow good track performance and longevity. It is generally believed that an increased amount of fabric contributes these performances. In areas of the track where there is no rod, it is about at mid-thickness of the track where the fiber of the rubber is the strongest, this line of zero stress in cross section of the track separating the region of compressive stress from that of tensile stress being known as the neutral fiber.

In spite of efforts in this field, there is still a need for a lighter, cost effective track.

SUMMARY OF THE INVENTION

More specifically, there is provided a track for a tracked vehicle, comprising a molded rubber base sandwiching a cord layer and a single layer of ply fabric extending at least in parts longitudinally in the rubber base.

Other objects, advantages and features of the present invention will become more apparent upon reading of the following non-restrictive description of embodiments thereof, given by way of example only with reference to the accompanying drawings.

BRIEF DESCRIPTION OF THE DRAWINGS

In the appended drawings:

FIG. 2 is a perspective view of a portion of a track according to an embodiment of the present invention;

FIGS. 3A-3F are cross-sectional views of track according to different embodiments of the present invention;

DESCRIPTION OF EMBODIMENTS OF THE INVENTION

As shown in FIG. 2, a track 10 according to an embodiment of the present invention comprises a ground engaging outer side 12 and an inner side (not seen in FIG. 2).

Figure 1:
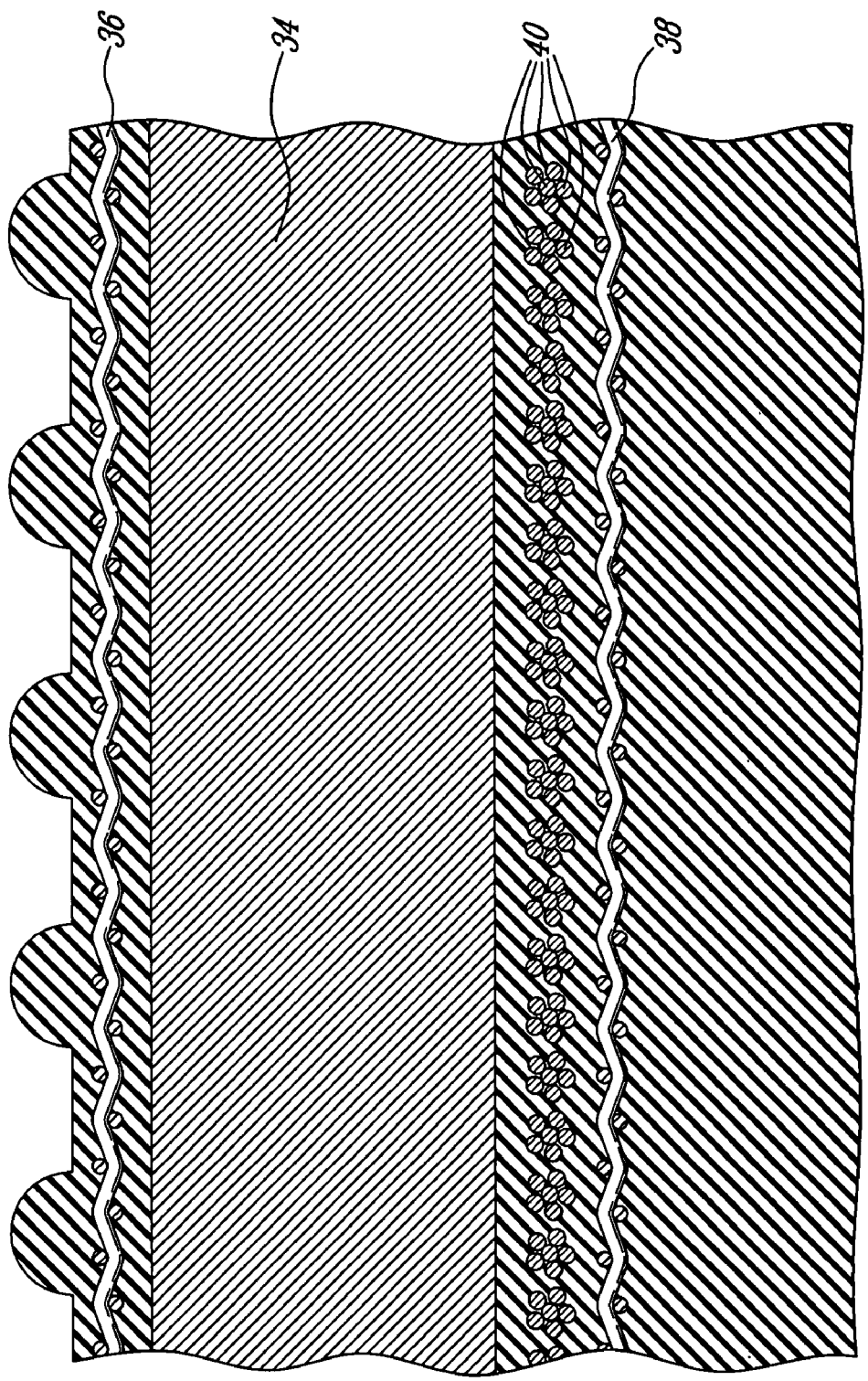
FIG. 1 is a cross section of a track as known in the art.
Figure 3A:
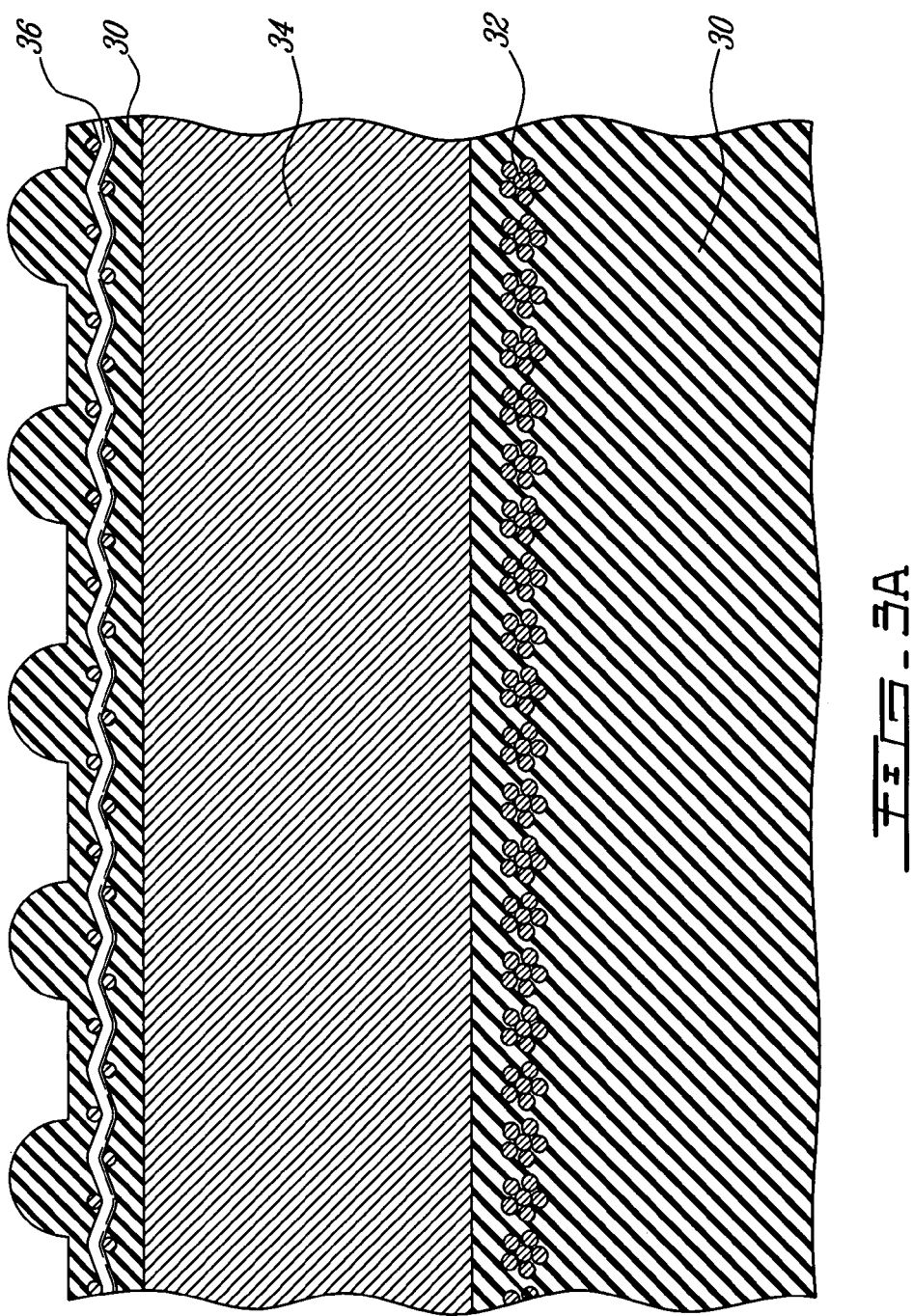

As seen in the cross-section of FIG. 3A, the track 10 is formed of a molded rubber base 30 sandwiching a cord layer 32, a cross bar 34 and a top layer of ply fabric 36 extending longitudinally.

The cross bar 34 may consists of a rod as known in the art, made of composite material for example. It is located at spaced intervals along the longitudinal direction of the track beneath the profiles 14 projecting from the outer side 12 of the track.

The cord layer 32 comprises a dense strand arrangement formed of a twist arrangement of strands, comprising for example at least 18 strands per inch for a cord of 1.25 mm. The strands include high strength, light weight materials such as man made fibers, such as Kevlar™, nylon, and polyester fabric for example.

In FIG. 3A, the cord layer 32 extends in the rubber base 30 and passes beneath the rod 34.

The cord layer 32 may be discontinued at locations of the track where the idler wheels pass.

The top ply of fabric 36 includes woven man-made fibers such as nylon for example.

Figure 3B:
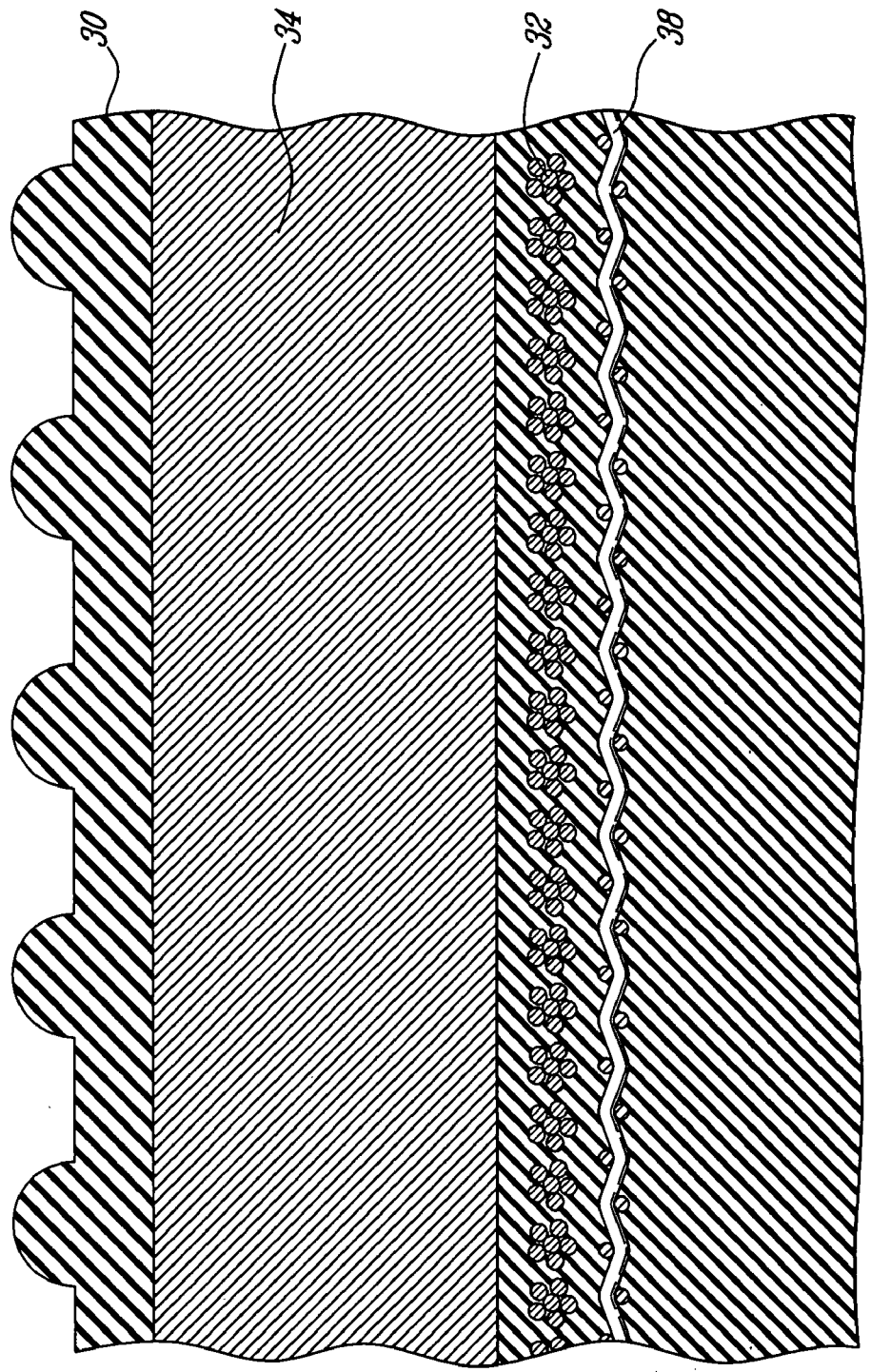

In FIG. 3B, the track is formed of a molded rubber base 30 sandwiching a single layer of ply fabric 38, a cord layer 32 and a cross bar 34. In this embodiment, the bottom ply of fabric 38 lies beneath the cord layer 32, and the region above the cross bar 34 comprises the molded rubber base 30 only.

Figure 3C:
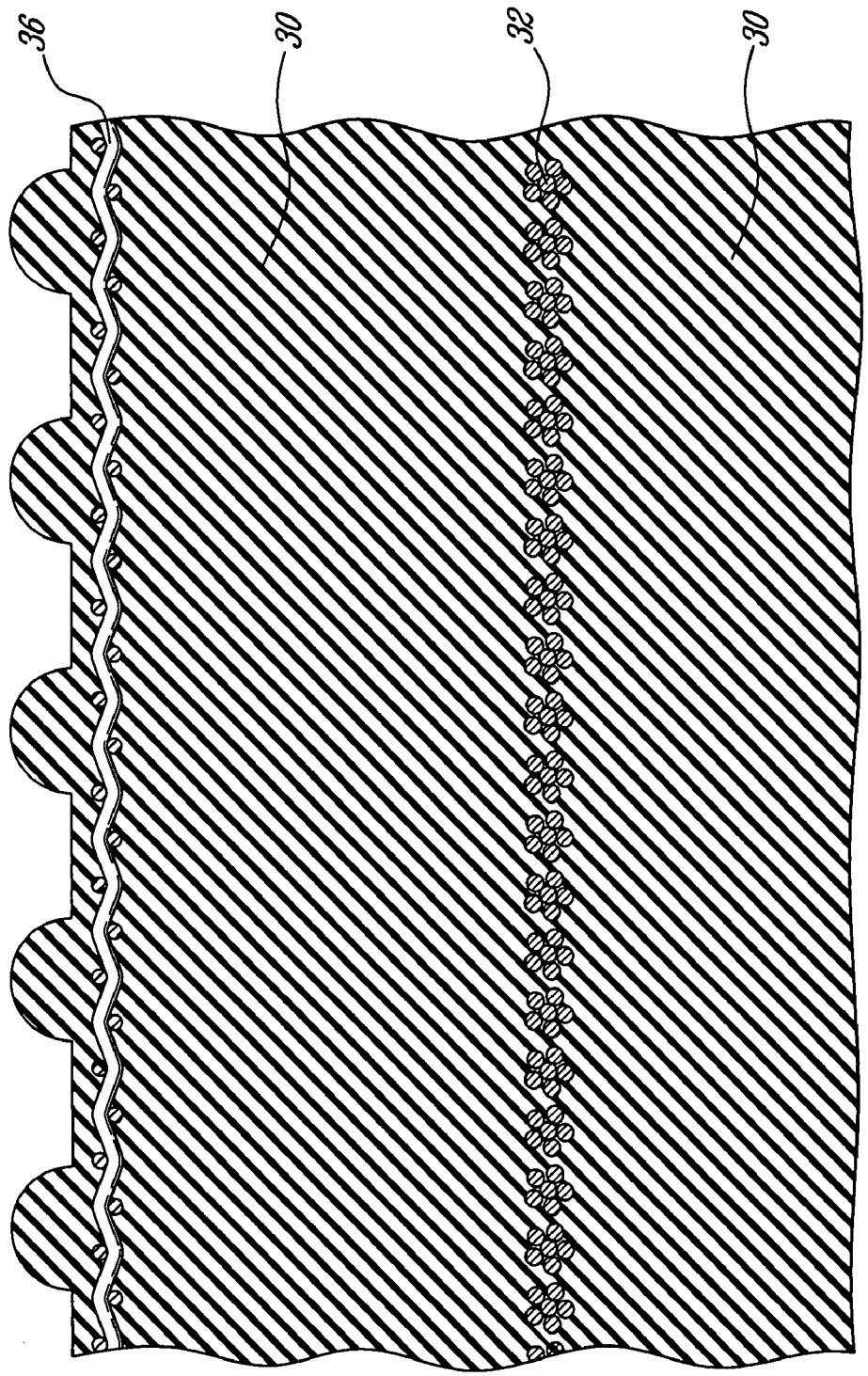

FIGS. 3C and 3D show a track devoid of cross bar, in which the molded rubber base 30 sandwiches a top layer of ply fabric 36 and a cord layer 32, and the molded rubber base 30 sandwiches a bottom layer of ply fabric 38 and a cord layer 32, respectively.

Figure 3E:
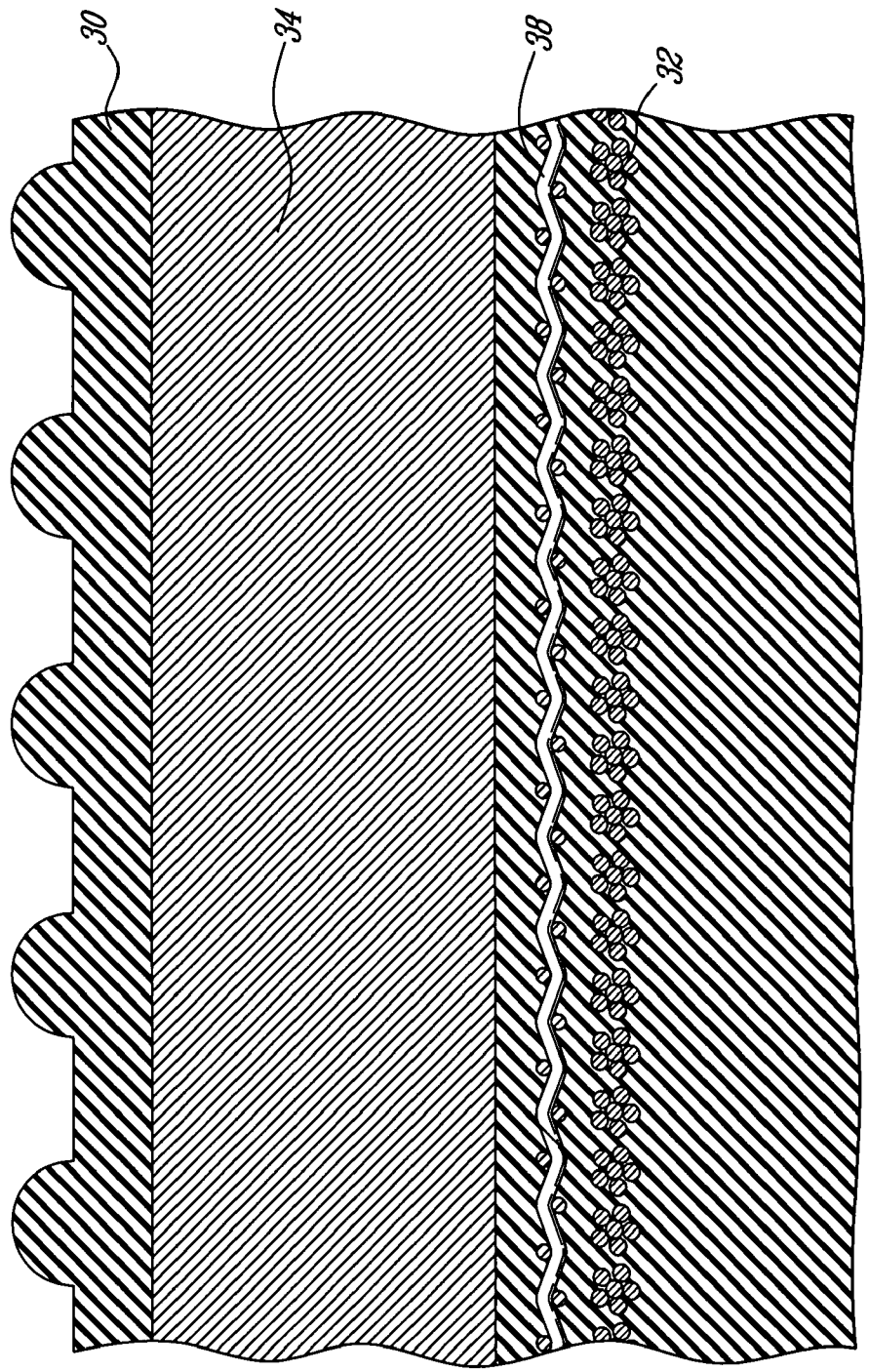

In FIG. 3E, as in FIG. 3B, the track is formed of a molded rubber base 30 sandwiching a cord layer 32, a single layer of ply fabric 38, a cross bar 34, the region above the cross bar 34 comprising the molded rubber base 30 only. In this embodiment, the single layer of ply fabric 38 lies between the cord layer 32 and the cross bar 34.

Figure 3F:
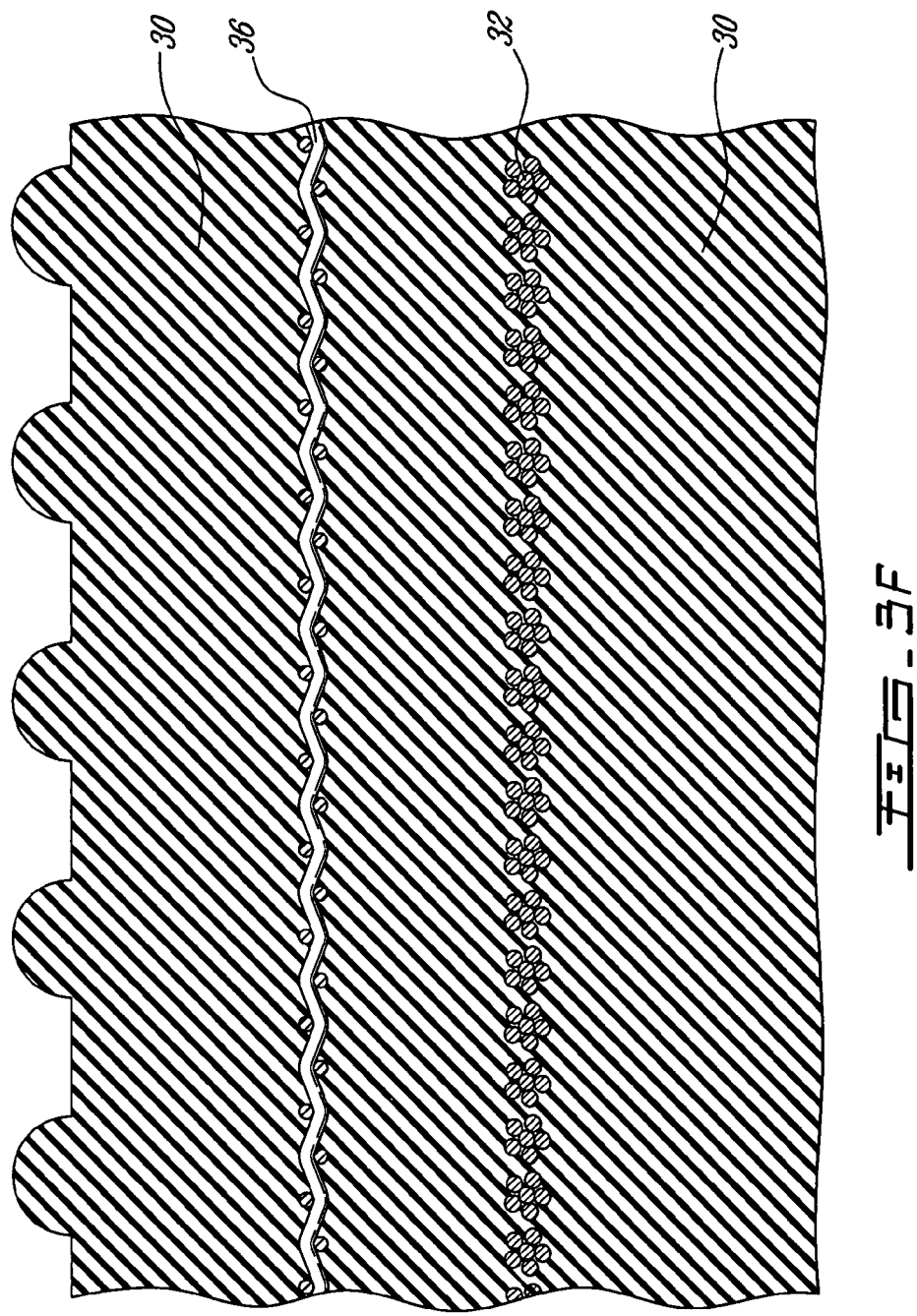

In FIG. 3F, instead of being located near the surface of the rubber base 30 as in FIG. 3C, the single layer of ply fabric 36 is located towards the interior of the rubber base 30.

Figure 4:
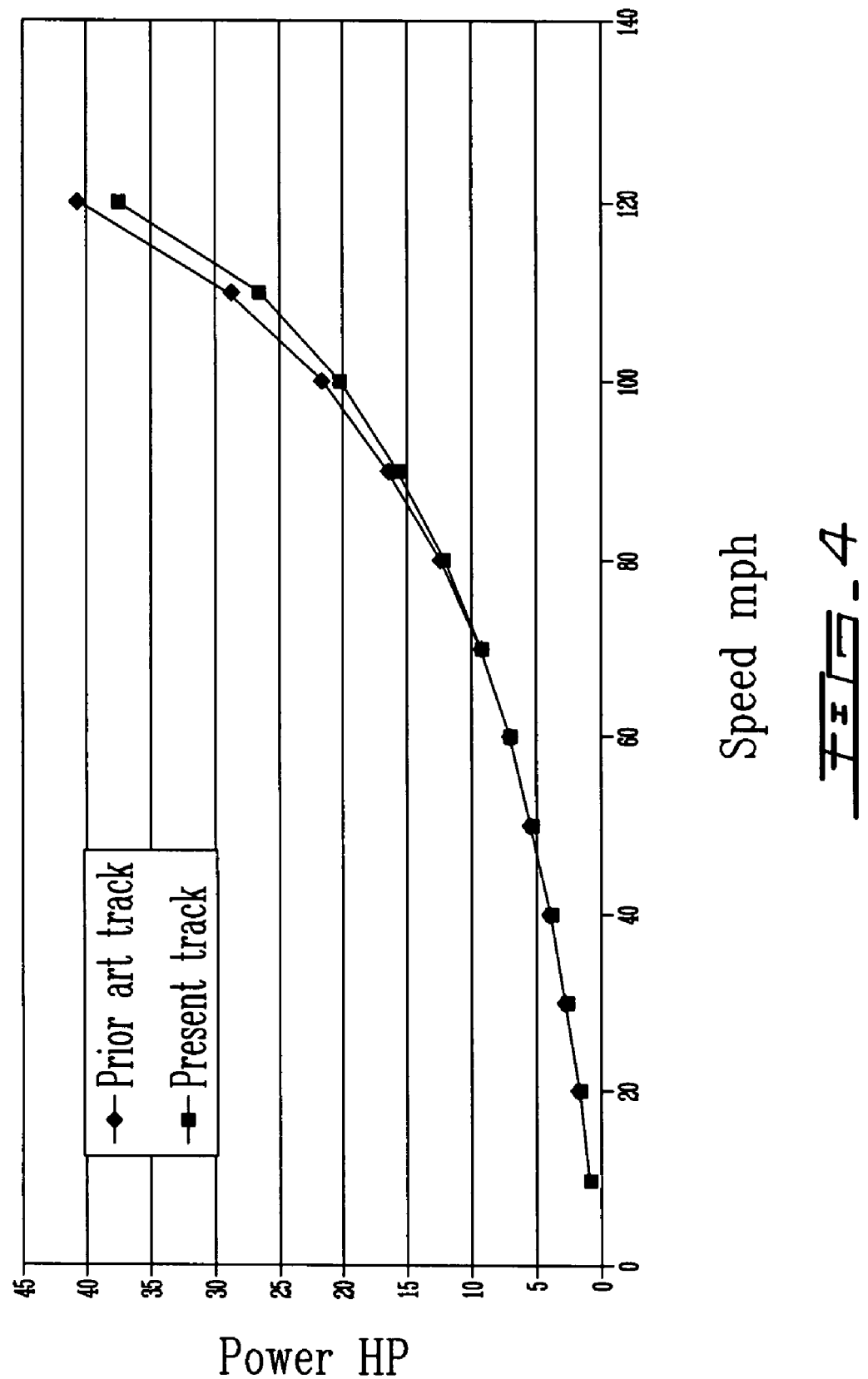
FIG. 4 is a graph of power as a function of speed, used by a track according to the present invention, in a test without traction.
Figure 5:
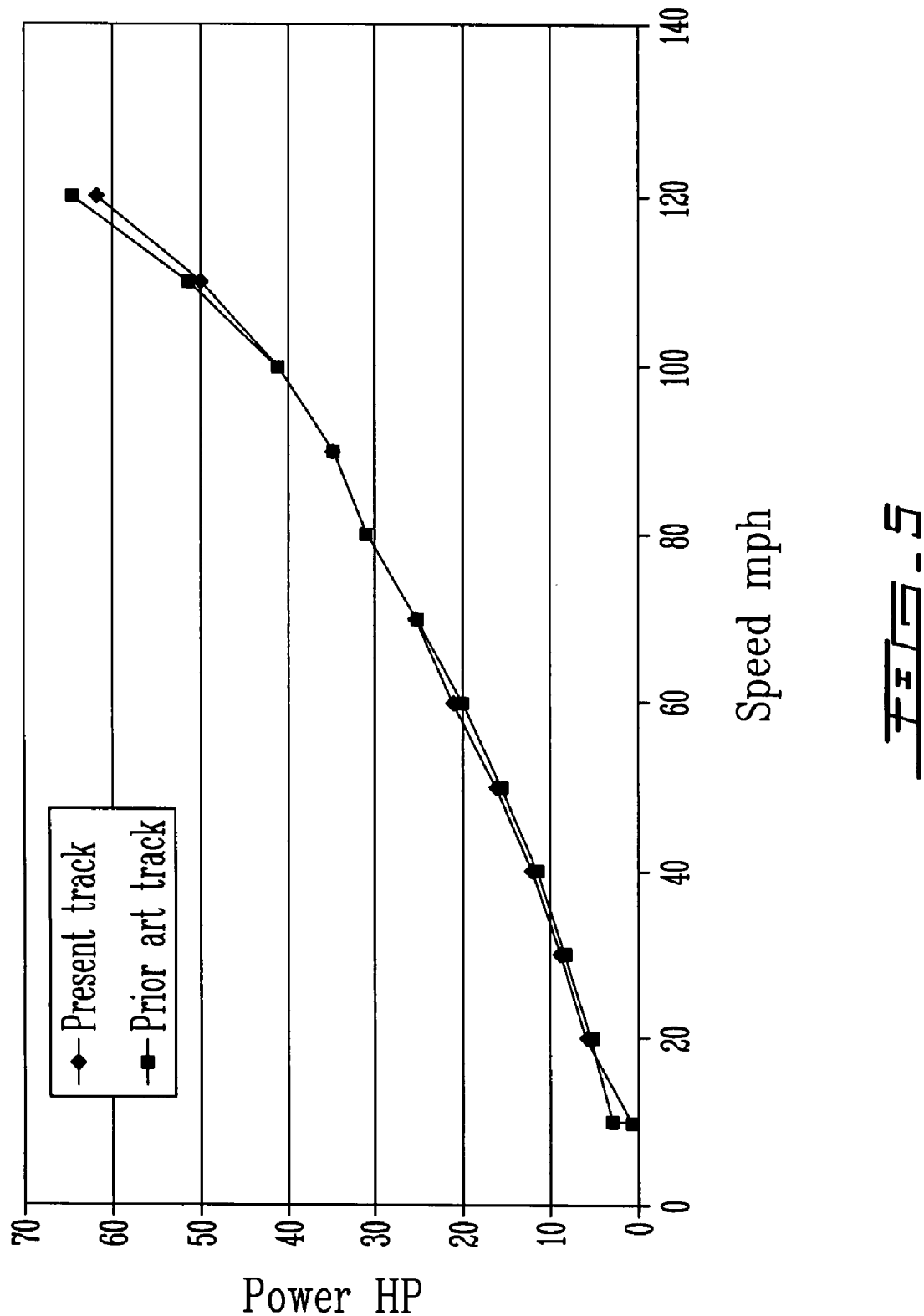
FIG. 5 is a graph of power as a function of speed, used by a track according to the present invention, in a test including traction.

As shown in FIGS. 4 and 5, the present track is found to necessitate equal or less power, which goes against the current belief in the industry that the greater the amount of fabric in the track composition, the better the performances.

People in the art will appreciate that the present invention provides, in contrast to a track standardly made in the art and including an arrangement of rubber, a first ply fabric, cord, rod, second ply fabric and rubber, a track comprising a single layer of ply fabric, yielding a track of reduced thickness, weight and cost, while maintaining target performances thereof in terms of power and longevity. In particular, the present composition is shown to decrease horse power, increase top speed and improve durability of the track when the latter is driven at high rotational speeds. It has also been found to optimize the so-called neutral fiber 50 bringing it closer to the outer side of the track.

The present track may be used for a range of tracked vehicles.

Although the present invention has been described hereinabove by way of embodiments thereof, it may be modified, without departing from the nature and teachings of the subject invention as defined in the appended claims.

What is claimed is:

1. An endless snowmobile track for traction of a snowmobile, the endless snowmobile track comprising:
   a) a rubber-based body having:
      an inner side for facing a driving wheel of the snowmobile; and
      a ground-engaging outer side for engaging a ground surface on which the snowmobile travels;
   b) a cord layer embedded within the rubber-based body and including a plurality of cords extending generally parallel to one another and in a longitudinal direction of the endless snowmobile track;
   c) a reinforcing woven fabric layer embedded within the rubber-based body between the cord layer and one of the inner side and the ground-engaging outer side, the endless snowmobile track being free of reinforcing woven fabric between the cord layer and the other one of the inner side and the ground-engaging outer side; and
   d) a plurality of cross bars embedded within the rubber-based body, spaced apart from one another along the longitudinal direction of the endless snowmobile track, and extending transversally to the longitudinal direction of the endless snowmobile track.

2. An endless snowmobile track as claimed in claim 1, wherein the one of the inner side and the ground-engaging outer side is the ground-engaging outer side.

3. An endless snowmobile track as claimed in claim 1, wherein the one of the inner side and the ground-engaging outer side is the inner side.

4. An endless snowmobile track as claimed in claim 1, wherein the reinforcing woven fabric layer is located within the rubber-based body such that a neutral area separating a region of compressive stress of the endless snowmobile track and a region of tensile stress of the endless snowmobile track is closer to the ground-engaging outer side than to the inner side in a thickness direction of the endless snowmobile track.

5. An endless snowmobile track as claimed in claim 1, wherein the reinforcing woven fabric layer comprises woven man-made fibers.

6. An endless snowmobile track as claimed in claim 1, wherein each cord includes a plurality of strands.

7. An endless snowmobile track as claimed in claim 6, wherein the strands of each cord are twisted.

8. An endless snowmobile track as claimed in claim 6, wherein the strands of each cord are made of at least one of Kevlar™, nylon and polyester.

9. An endless snowmobile track as claimed in claim 1, wherein the reinforcing woven fabric layer is located between the cross bars and the ground-engaging outer side.

10. An endless snowmobile track as claimed in claim 1, wherein the one of the inner side and the ground-engaging outer side is the inner side, the cross bars being located between the cord layer and the ground-engaging outer side.

11. An endless snowmobile track as claimed in claim 1, wherein the reinforcing woven fabric layer is located between the cord layer and the cross bars.

12. An endless snowmobile track as claimed in claim 1, wherein each cross bar comprises composite material.

13. A snowmobile comprising an endless snowmobile track as claimed in claim 1.

14. An endless all-terrain vehicle (ATV) track for traction of an ATV, the endless ATV track comprising:
   a) a rubber-based body having:
      an inner side for facing a driving wheel of the ATV; and
      a ground-engaging outer side for engaging a ground surface on which the ATV travels;
   b) a plurality of traction projections on the ground-engaging outer side, the traction projections engaging the ground surface when the ATV travels on the ground surface;
   c) a cord layer embedded within the rubber-based body and including a plurality of cords extending generally parallel to one another and in a longitudinal direction of the endless ATV track; and
   d) a reinforcing woven fabric layer embedded within the rubber-based body between the cord layer and one of the inner side and the ground-engaging outer side, the endless ATV track being free of reinforcing woven fabric between the cord layer and the other one of the inner side and the ground-engaging outer side.

15. An endless ATV track as claimed in claim 14, wherein the one of the inner side and the ground-engaging outer side is the ground-engaging outer side.

16. An endless ATV track as claimed in claim 14, wherein the one of the inner side and the ground-engaging outer side is the inner side.

17. An endless ATV track as claimed in claim 14, wherein the reinforcing woven fabric layer is located within the rubber-based body such that a neutral area separating a region of compressive stress of the endless ATV track and a region of tensile stress of the endless ATV track is closer to the ground-engaging outer side than to the inner side in a thickness direction of the endless ATV track.

18. An endless ATV track as claimed in claim 14, wherein the reinforcing woven fabric layer comprises woven man-made fibers.

19. An endless ATV track as claimed in claim 14, wherein each cord includes a plurality of strands.

20. An endless ATV track as claimed in claim 19, wherein the strands of each cord are twisted.

21. An endless ATV track as claimed in claim 19, wherein the strands of each cord are made of at least one of Kevlar™, nylon and polyester.

22. An endless ATV track as claimed in claim 14, comprising a plurality of cross bars embedded within the rubber-based body, spaced apart from one another along the longitudinal direction of the endless ATV track, and extending transversally to the longitudinal direction of the endless ATV track.

23. An endless ATV track as claimed in claim 22, wherein the reinforcing woven fabric layer is located between the cross bars and the ground-engaging outer side.

24. An endless ATV track as claimed in claim 22, wherein the one of the inner side and the ground-engaging outer side is the inner side, the cross bars being located between the cord layer and the ground-engaging outer side.

25. An endless ATV track as claimed in claim 22, wherein the reinforcing woven fabric layer is located between the cord layer and the cross bars.

26. An endless ATV track as claimed in claim 22, wherein each cross bar comprises composite material.

27. An ATV comprising an endless ATV track as claimed in claim 14.

28. An endless snowmobile track as claimed in claim 5, wherein the woven man-made fibers are woven nylon fibers.

29. An endless snowmobile track as claimed in claim 1, wherein the reinforcing woven fabric layer is spaced apart from the cord layer in a thickness direction of the endless snowmobile track.

30. An endless snowmobile track as claimed in claim 29, wherein the reinforcing woven fabric layer is spaced apart from the cord layer in the thickness direction of the endless snowmobile track by a distance greater than a thickness of the reinforcing woven fabric layer.

31. An endless snowmobile track as claimed in claim 1, wherein, when operated at a given speed, the endless snowmobile track consumes less power than if the endless snowmobile track comprised an additional layer of reinforcing woven fabric between the cord layer and the other one of the inner side and the ground-engaging outer side.

32. An endless ATV track as claimed in claim 18, wherein the woven man-made fibers are woven nylon fibers.

33. An endless ATV track as claimed in claim 14, wherein the reinforcing woven fabric layer is spaced apart from the cord layer in a thickness direction of the endless ATV track.

34. An endless ATV track as claimed in claim 33, wherein the reinforcing woven fabric layer is spaced apart from the cord layer in the thickness direction of the endless ATV track by a distance greater than a thickness of the reinforcing woven fabric layer.

35. An endless ATV track as claimed in claim 14, wherein, when operated at a given speed, the endless ATV track consumes less power than if the endless ATV track comprised an additional layer of reinforcing woven fabric between the cord layer and the other one of the inner side and the ground-engaging outer side.

36. An endless snowmobile track as claimed in claim 31, wherein the given speed is above 100 miles per hour.

37. An endless ATV track as claimed in claim 35, wherein the given speed is above 100 miles per hour.

38. An endless ATV track as claimed in claim 14, wherein individual ones of the traction projections are spaced apart from one another along the longitudinal direction of the endless ATV track.

39. An endless ATV track as claimed in claim 38, wherein individual ones of the traction projections are spaced apart from one another along a widthwise direction of the endless ATV track.

40. An endless ATV track as claimed in claim 14, wherein a given one of the traction projections comprises a first part having a first height and a second part having a second height different from the first height, each of the first height and the second height being measured along a thickness direction of the endless ATV track.

41. An endless ATV track as claimed in claim 14, wherein a given one of the traction projections comprises a first part having a first thickness and a second part having a second thickness different from the first thickness, each of the first thickness and the second thickness being measured along the longitudinal direction of the endless ATV track.

42. An endless snowmobile track for traction of a snowmobile, the endless snowmobile track comprising:
a) a rubber-based body having:
an inner side for facing a driving wheel of the snowmobile; and
a ground-engaging outer side for engaging a ground surface on which the snowmobile travels;
b) a plurality of traction projections on the ground-engaging outer side, the traction projections engaging the ground surface when the snowmobile travels on the ground surface;
c) a cord layer embedded within the rubber-based body and including a plurality of cords extending generally parallel to one another and in a longitudinal direction of the endless snowmobile track; and
d) a reinforcing woven fabric layer embedded within the rubber-based body between the cord layer and one of the inner side and the ground-engaging outer side, the endless snowmobile track being free of reinforcing woven fabric between the cord layer and the other one of the inner side and the ground-engaging outer side.

43. An endless snowmobile track as claimed in claim 42, wherein the one of the inner side and the ground-engaging outer side is the ground-engaging outer side.

44. An endless snowmobile track as claimed in claim 42, wherein the one of the inner side and the ground-engaging outer side is the inner side.

45. An endless snowmobile track as claimed in claim 42, wherein the reinforcing woven fabric layer is located within the rubber-based body such that a neutral area separating a region of compressive stress of the endless snowmobile track and a region of tensile stress of the endless snowmobile track is closer to the ground-engaging outer side than to the inner side in a thickness direction of the endless snowmobile track.

46. An endless snowmobile track as claimed in claim 42, wherein the reinforcing woven fabric layer comprises woven man-made fibers.

47. An endless snowmobile track as claimed in claim 42, wherein each cord includes a plurality of strands.

48. An endless snowmobile track as claimed in claim 47, wherein the strands of each cord are twisted.

49. An endless snowmobile track as claimed in claim 47, wherein the strands of each cord are made of at least one of Kevlar™, nylon and polyester.

50. An endless snowmobile track as claimed in claim 42, comprising a plurality of cross bars embedded within the rubber-based body, spaced apart from one another along the longitudinal direction of the endless snowmobile track, and extending transversally to the longitudinal direction of the endless snowmobile track.

51. An endless snowmobile track as claimed in claim 50, wherein the reinforcing woven fabric layer is located between the cross bars and the ground-engaging outer side.

52. An endless snowmobile track as claimed in claim 50, wherein the one of the inner side and the ground-engaging outer side is the inner side, the cross bars being located between the cord layer and the ground-engaging outer side.

53. An endless snowmobile track as claimed in claim 50, wherein the reinforcing woven fabric layer is located between the cord layer and the cross bars.

54. An endless snowmobile track as claimed in claim 50, wherein each cross bar comprises composite material.

55. An endless snowmobile track as claimed in claim 42, wherein the reinforcing woven fabric layer is spaced apart from the cord layer in a thickness direction of the endless snowmobile track.

56. An endless snowmobile track as claimed in claim 55, wherein the reinforcing woven fabric layer is spaced apart from the cord layer in the thickness direction of the endless snowmobile track by a distance greater than a thickness of the reinforcing woven fabric layer.

57. An endless snowmobile track as claimed in claim 42, wherein, when operated at a given speed, the endless snowmobile track consumes less power than if the endless snowmobile track comprised an additional layer of reinforcing woven fabric between the cord layer and the other one of the inner side and the ground-engaging outer side.

58. An endless snowmobile track as claimed in claim 57, wherein the given speed is above 100 miles per hour.

59. An endless snowmobile track as claimed in claim 42, wherein individual ones of the traction projections are spaced apart from one another along the longitudinal direction of the endless snowmobile track.

60. An endless snowmobile track as claimed in claim 59, wherein individual ones of the traction projections are spaced apart from one another along a widthwise direction of the endless snowmobile track.

61. An endless snowmobile track as claimed in claim 42, wherein a given one of the traction projections comprises a first part having a first height and a second part having a second height different from the first height, each of the first height and the second height being measured along a thickness direction of the endless snowmobile track.

62. An endless snowmobile track as claimed in claim 42, wherein a given one of the traction projections comprises a first part having a first thickness and a second part having a second thickness different from the first thickness, each of the first thickness and the second thickness being measured along the longitudinal direction of the endless snowmobile track.

63. A snowmobile comprising an endless snowmobile track as claimed in claim 42.

* * * * *